United States Patent
Liu et al.

(10) Patent No.: US 10,499,365 B2
(45) Date of Patent: Dec. 3, 2019

(54) PAGING DECODING

(71) Applicant: Telefonaktiebolaget LM Ericsson (publ), Stockholm (SE)

(72) Inventors: Peng Liu, Beijing (CN); Pei Li, Beijing (CN); Jing Ma, Beijing (CN); Zhenguo Ma, Beijing (CN)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 1 day.

(21) Appl. No.: 15/317,953

(22) PCT Filed: Jun. 25, 2014

(86) PCT No.: PCT/CN2014/080726
§ 371 (c)(1),
(2) Date: Dec. 11, 2016

(87) PCT Pub. No.: WO2015/196386
PCT Pub. Date: Dec. 30, 2015

(65) Prior Publication Data
US 2017/0142685 A1 May 18, 2017

(51) Int. Cl.
*H04B 7/00* (2006.01)
*H04W 68/00* (2009.01)
(Continued)

(52) U.S. Cl.
CPC ....... *H04W 68/00* (2013.01); *H04W 36/0083* (2013.01); *H04W 36/08* (2013.01)

(58) Field of Classification Search
CPC ..... H04W 68/00; H04W 36/08; H04W 36/18; H04W 52/0245; H04W 68/02
See application file for complete search history.

(56) References Cited

U.S. PATENT DOCUMENTS 9,119,153 B2 * 8/2015 Deivasigamani ............................ H04W 52/0245
9,148,837 B2 * 9/2015 Gude .................... H04W 36/18
(Continued)

FOREIGN PATENT DOCUMENTS

CN 101198136 A 6/2008
CN 101277543 A 10/2008
(Continued)

OTHER PUBLICATIONS

European Communication and Supplementary European Search Report, dated Feb. 19, 2018, in connection with European Application No. 14895604.8, 10 pages.
(Continued)

*Primary Examiner* — Hanh N Nguyen
(74) *Attorney, Agent, or Firm* — Leffler Intellectual Property Law, PLLC

(57) ABSTRACT

A paging decoding method in a wireless communication device adapted to operate in association with a primary cell provided by a network node of a cellular communication system, wherein the primary cell has one or more neighboring cells is disclosed. The method comprises receiving a paging signal during a paging occasion, temporarily storing the received paging signal, attempting to decode the received paging signal based on one or more parameters of the primary cell, and (if decoding of the received paging signal based on one or more parameters of the primary cell is un-successful) attempting to decode the temporarily stored received paging signal based on parameters of one of the neighboring cells. In some embodiments, the method may further comprise selecting the one of the neighboring cells based on one or more of respective received signal strengths of the neighboring cells and respective received signal powers of the neighboring cells after receiving the paging signal during the paging occasion. Corresponding
(Continued)

computer program product, arrangement and wireless communication device are also disclosed.

19 Claims, 2 Drawing Sheets

(51) Int. Cl.
*H04W 36/00* (2009.01)
*H04W 36/08* (2009.01)

(56) References Cited

U.S. PATENT DOCUMENTS

| 2004/0166882 | A1 | 8/2004 | He |
| 2010/0159929 | A1 | 6/2010 | Homchaudhuri |
| 2010/0190447 | A1 | 7/2010 | Agrawal et al. |
| 2010/0330992 | A1 | 12/2010 | Bhattacharjee et al. |
| 2013/0337809 | A1 | 12/2013 | Gude et al. |

FOREIGN PATENT DOCUMENTS

| CN | 101321308 A | 12/2008 |
| CN | 103596229 A | 2/2014 |
| EP | 2046068 A1 | 4/2009 |
| EP | 2194736 A1 | 6/2010 |
| WO | 2011107245 A1 | 9/2011 |
| WO | 2012064600 A1 | 5/2012 |

OTHER PUBLICATIONS

PCT International Search Report, dated Mar. 30, 2015, in connection with International Application No. PCT/CN2014/080726, all pages.
PCT Written Opinion, dated Mar. 30, 2015, in connection with International Application No. PCT/CN2014/080726, all pages.
Chinese Search Report, dated Mar. 11, 2019, in connection with Chinese Application No. 201480080146.X, 2 pages.
English language translation of Chinese Office Action, dated Mar. 11, 2019, in connection with Chinese Application No. 201480080146.X, 2 pages.
Chinese Office Action, dated Aug. 20, 2019, in connection with Chinese Application No. 201480080146.X, 7 pages.
English language summary of Chinese Office Action, dated Aug. 20, 2019, in connection with Chinese Application No. 201480080146.X, 2 pages.

* cited by examiner

PAGING DECODING

TECHNICAL FIELD

The present invention relates generally to the field of paging reception and decoding. More particularly, it relates to paging reception and decoding in the presence of interference.

BACKGROUND

In typical cellular communication networks, a wireless communication device operating in association with the network is required to monitor signaling from the network to be able to detect paging of the wireless communication device by the network. For example, a user equipment (UE) operating in accordance with the specifications for UMTS LTE-A (Third Generation Partnership Project—3GPP—Universal Mobile Telecommunication Standard—Long Term Evolution, Advanced) should receive and attempt to decode the paging channel (PCH) at certain moments in time (e.g. periodically) to monitor whether or not it is paged.

Typically, monitoring of paging should be performed, at least, when the wireless communication device is in idle mode, and in many applications (e.g. for UMTS LTE-A) this protocol may be followed regardless of whether the UE is in idle or connected mode.

Problems related to paging reception may be experienced if one or more neighboring cells use the same carrier frequency as a serving/camped-on cell of a wireless communication device. Then, signals from the one or more neighboring cells act as intra-frequency interference when the paging signal of the serving/camped-on cell is to be received and decoded. This is, of course, particularly problematic if signals of at least one of the one or more neighboring cells, when received at the wireless communication device, are stronger than the signal of the serving/camped-on cell. In this situation, it is not uncommon that the wireless communication device fails to decode the paging signal of the serving/camped-on cell due to the severe intra-frequency interference.

FIG. 1 illustrates an example scenario where a wireless communication device 100 is in coverage of a serving/camped-on cell 121 provided by a network node 120 and of a neighboring cell 111 provided by a network node 110. The wireless communication device 100 is closer to the network node 110 providing the neighboring cell 111 than it is to the network node 120 providing the serving/camped-on cell 121. Hence, an interfering signal 112 from the network node 110 may be stronger than a paging signal 122 from the network node 120 when received at the wireless communication device 100, and the paging in signal 122 may be missed.

Solving this problem by using interference rejection combining (IRC) is typically not possible, at least not if one or more of the intra-frequency neighboring cells are much stronger than the serving/camped-on cell.

The problem may be addressed by using interference cancellation (IC). However, using cell specific reference signal interference cancellation (CRS-IC) may not provide sufficient cancellation since the interference on the paging signals is not only related to the CRS of the neighboring cells, but also to the PDSCH (physical downlink shared channel) of the neighboring cells, and using interference cancellation for paging on PDSCH involves very complex signal generation and reconstruction for the neighboring cells. Typically, the wireless communication device may need to generate symbols of one or more interfering (neighboring) cells, e.g. by channel encoding, scrambling, modulation mapping, layer mapping, precoding and RE (resource element) mapping, which is extremely complex and typically not a practical option.

US 2010/0159929 A1 discloses checking whether a mobile station is experiencing high interference, which may occur when the mobile station fails to decode a paging channel of a serving cell. Upon determining that the mobile station is experiencing high interference, the mobile station selects a set of cells having the same location area identifier as the serving cell from a list of top neighboring cells, selects a cell from the set of cells, and synchronizes with a base station of the selected cell. After synchronizing, the mobile station decodes the paging channel of the selected cell and reads a second page from the paging channel of the selected cell including identical information data as the first page. This approach requires synchronization with the base station of the selected cell and reception of the paging channel of the selected cell, which consumes unnecessary power and introduces considerable delay before the page may be read.

US 2013/0337809 A1 discloses an access terminal dedicating fingers of a rake receiver to listen to paging information transmitted from one or more neighboring cells to avoid missing an incoming page. Such an approach introduces extra complexity and/or unnecessary power consumption, especially if several neighboring cells are to be listened to. Furthermore, fewer rake fingers will be available for the serving cell which may actually compromise paging reception performance in some scenarios.

Therefore, there is a need for alternative methods and devices for paging reception and decoding in intra-frequency interference scenarios.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It should be noted that the term primary cell is used herein as a notation to describe, e.g. a cell on which the wireless communication device is camped (a camped-on cell) and/or a serving cell. The primary cell does not necessarily have to (but may) be a primary cell of a carrier aggregation system.

It is an object of some embodiments to obviate at least some of the above disadvantages and to provide methods and devices for paging reception and decoding in intra-frequency interference scenarios.

According to a first aspect, this is achieved by a paging reception and decoding method in a wireless communication device adapted to operate in association with a primary cell provided by a network node of a cellular communication system, wherein the primary cell has one or more neighboring cells.

The method comprises receiving a paging signal during a paging occasion, temporarily storing the received paging signal, attempting to decode the received paging signal based on one or more parameters of the primary cell, and (if decoding of the received paging signal based on one or more parameters of the primary cell is un-successful) attempting to decode the temporarily stored received paging signal based on parameters of one of the neighboring cells.

In some embodiments, the method may further comprise selecting the one of the neighboring cells based on one or more of respective received signal strengths of the neighboring cells and respective received signal powers of the neighboring cells.

The one of the neighboring cells may be selected after receiving the paging signal during the paging occasion according to some embodiments.

Selecting the one of the neighboring cells may, according to some embodiments, comprise preparing an ordered list of the one or more neighboring cells and selecting the one of the neighboring cells as the first cell of the ordered list if decoding of the received paging signal based on one or more parameters of the primary cell is un-successful. The ordered list may be prepared based on one or more of respective received signal strengths of the neighboring cells and respective received signal powers of the neighboring cells before attempting to decode the received paging signal based on one or more parameters of the primary cell.

In some embodiments, the one or more neighboring cells may comprise cells of a cell list received by the wireless communication device in connection with a location update procedure towards the cellular communication system.

In some embodiments, the one or more neighboring cells may comprise cells with respective received signal strength above a signal strength threshold and/or cells with respective received signal power above a signal power threshold.

The one or more parameters of the primary and neighboring cells may comprise a respective cell identity according to some embodiments.

In some embodiments, the decoding of the received paging signal based on one or more parameters of the primary cell may be considered un-successful if a cyclic redundancy check of the decoding fails.

According to some embodiments, the method may further comprise (if decoding of the temporarily received paging signal based on one or more parameters of the one of the neighboring cells is un-successful) attempting to decode the temporarily stored received paging signal based on parameters of another one of the neighboring cells.

The method may further comprise (if any of the attempts to decode the received paging signal is successful) transmitting a response to the paging signal to the network node according to some embodiments.

A second aspect is a computer program product comprising a computer readable medium, having thereon a computer program comprising program instructions. The computer program is loadable into a data-processing unit and adapted to cause execution of the method according to the first aspect when the computer program is run by the data-processing unit.

According to a third aspect, a paging reception and decoding arrangement is provided for a wireless communication device adapted to operate in association with a primary cell provided by a network node of a cellular communication system, wherein the primary cell has one or more neighboring cells.

The arrangement comprises a receiver adapted to receive a paging signal during a paging occasion, a signal storing unit adapted to temporarily store the received paging signal, a paging decoder adapted to decode the paging signal and a controller.

The controller is adapted to cause the paging decoder to attempt to decode the received paging signal based on one or more parameters of the primary cell, and (if decoding of the received paging signal based on one or more parameters of the primary cell is un-successful) attempt to decode the temporarily stored received paging signal based on parameters of one of the neighboring cells.

The arrangement may, according to some embodiments, further comprise a selector adapted to select the one of the neighboring cells based on one or more of respective received signal strengths of the neighboring cells and respective received signal powers of the neighboring cells.

In some embodiments, the arrangement may further comprise a cell list storing unit adapted to hold a cell list received by the wireless communication device in connection with a location update procedure towards the cellular communication system, wherein the one or more neighboring cells comprise cells of the cell list.

The arrangement may further comprise a comparator according to some embodiments. The comparator may be adapted to compare received signal strengths to a signal strength threshold, wherein the one or more neighboring cells comprise cells with respective received signal strength above the signal strength threshold. Alternatively or additionally, the comparator may be adapted to compare received signal powers to a signal power threshold, wherein the one or more neighboring cells comprise cells with respective received signal power above the signal power threshold.

In some embodiments, the controller may be further adapted to cause the paging decoder to (if decoding of the temporarily received paging signal based on one or more parameters of the one of the neighboring cells is un-successful) attempt to decode the temporarily stored received paging signal based on parameters of another one of the neighboring cells.

The arrangement may, according to some embodiments, further comprise a transmitter adapted to (if any of the attempts to decode the received paging signal is successful) transmit a response to the paging signal to the network node.

A fourth aspect is a wireless communication device comprising the arrangement according to the third aspect.

In some embodiments, the third and fourth aspects may additionally have features identical with or corresponding to any of the various features as explained above for the first aspect.

An advantage of some embodiments is that paging reception performance in intra-frequency interference scenarios may be improved. Thus, a more robust approach may be provided according to some embodiments. For example, the probability to miss a page (missed detection of paging signal) may be decreased.

Another advantage of some embodiments is that the improved paging performance may be achieved using a low complexity implementation.

Yet an advantage of some embodiments is that the improved paging performance may be achieved at low power consumption.

Yet another advantage of some embodiments is that the improved paging performance may be achieved with low delay.

Other advantages of some embodiments are that an efficient, effective and very simple approach to enhance paging reception and decoding is provided, enabling re-use of existing functionality. Thereby, implementations according to some embodiments may be inexpensive to develop and maintain.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where paging reception and decoding is enhanced using signals transmitted from neighboring cells for intra-frequency interference scenarios. An intra-frequency scenario is when the primary and the interfering neighbor cells operate on the same carrier frequency, and the neighbor cells may be denoted intra-frequency neighbor cells. UMTS LTE-A TDD (time division duplex) and UMTS LTE-A FDD (frequency division duplex) will be used as illustrative examples of systems wherein some embodiments may be applicable. This is, however, not to be understood as limiting. Contrarily, embodiments may be equally applicable in other systems with intra-frequency interference scenarios.

Network operators often use the same configuration (e.g. paging cycle, system frame number—SFN, allocation, etc) in neighboring cells or even in wider areas. Moreover, the paging occasions will overlap in synchronized networks (such as all UMTS TDD networks and many UMTS FDD networks) if the same paging cycle length is used, since only the IMSI (international mobile subscriber identity) of the wireless communication device—and not the cell identity—is used to determine paging frame (PF) and paging occasion (PO) (see e.g. 3GPP Technical Specification (TS) 36.304).

Hence, paging signals or paging messages of a primary cell is allocated the same moment of time for transmission as paging signals of one or more neighboring cells in many networks. For example, a same paging frame (PF) and/or a same paging occasion (PO) may be used for the one or more neighboring cell as for the primary cell in UMTS LTE TDD or a synchronized version of UMTS LTE FDD.

According to some embodiments, a wireless communication device may receive a paging signal (e.g. in the applicable PO and PF) comprising intra-frequency interference from one or more neighboring cells. The received paging signal is stored (e.g. in a local memory of the wireless communication device) and decoding of the paging signal is attempted using parameters of the primary cell. If this decoding attempt fails (i.e. the wireless communication device cannot decode PCH of the primary cell correctly) decoding of the stored aging signal is attempted using parameters of a neighboring cell. Typically, the strongest neighboring cell is used in this attempt firstly, and the process may be iterated with neighboring cells of decreasing signal strength as experienced by the wireless communication device. Normally, a page is transmitted in all tracking areas in the tracking area list (such as, for example, in UMTS LTE), and then there is a high probability that a paging signal or message decoded for a neighboring cell is the same as that of the primary cell.

Figure 1:
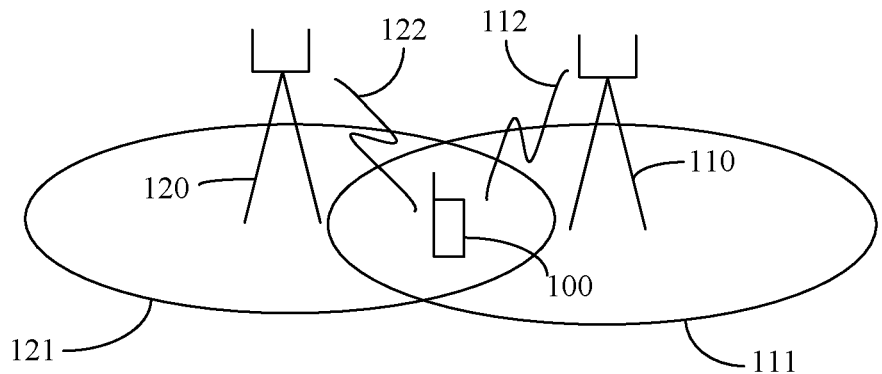
FIG. 1 is a schematic drawing illustrating an intra-frequency interference scenario wherein some embodiments may be applicable.
Figure 2:
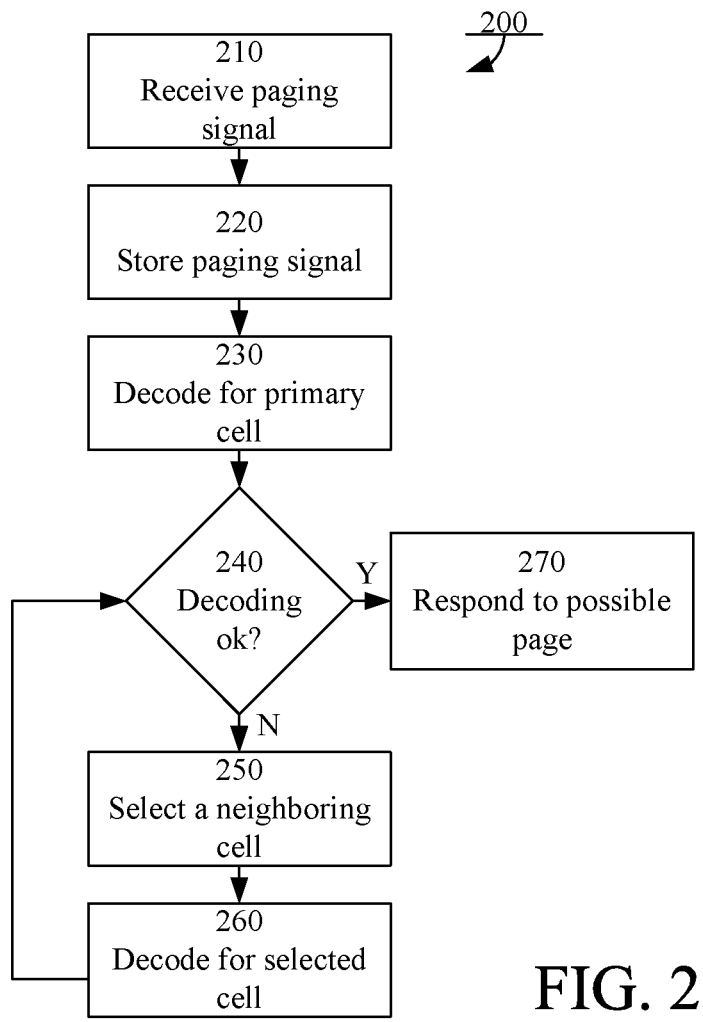
FIG. 2 is a flowchart illustrating example method steps according to some embodiments.

FIG. 2 illustrates an example paging decoding method 200 according to some embodiments. The method 200 may, for example, be performed by a wireless communication device, such as the device 100 of FIG. 1 or the device 400 of FIG. 4. A wireless communication device performing the method 200 may be adapted to operate in association with a primary cell (compare with 121 of FIG. 1) provided by a network node (compare with 120 of FIG. 1) of a cellular communication system and there may be one or more neighboring cells (compare with 111 of FIG. 1).

A neighboring cell may, for example, be defined as a cell of the same geographical area (e.g. tracking area or location area) as the primary cell. In some embodiments, the one or more neighboring cells may comprise cells of a cell list (e.g. a tracking area list) received by the wireless communication device in connection with a location update procedure towards the cellular communication system.

The example method 200 starts in step 210 where a paging signal is received during a paging occasion. The term paging occasion is to be understood herein as defining a timing of a paging signal. Hence, it may comprise any or both of a PO and a PF, for example. Typically, the paging signal received in step 210 may comprise a signal component transmitted in the primary cell and possibly one or more signal components (interference) transmitted in respective ones of the one or more neighboring cells.

The paging signal received in step 210 is temporarily stored in step 220. The storing may be realized through any suitable storing unit (e.g. a memory or register) associated with or comprised in the wireless communication device.

In step 230, it is attempted to decode the received paging signal based on one or more parameters of the primary cell. The one or more parameters may, for example, comprise the cell identity of the primary cell. Alternatively or additionally, the one or more parameters may, for example, comprise a transmission antenna number, a subframe number, and/or a system bandwidth.

In a typical paging decoding procedure it is determined whether or not the decoding is successful by performing a cyclic redundancy check (CRC). Alternatively or additionally, other suitable possibilities to determine whether or not the decoding is successful may be used.

If the decoding of step 230 is successful (Y-path out of step 240), the wireless communication device responds to the page (if any) in step 270 by transmitting a response to the paging signal to the network node providing the primary cell.

If the decoding of step 230 is un-successful (N-path out from step 240), one of the neighboring cells is selected in step 250 and it is attempted to decode the received paging signal based on one or more parameters of the selected neighboring cell in step 260. The one or more parameters may, for example, comprise the cell identity of the selected cell (which is typically known from the neighboring cell list).

If the decoding of step 260 is successful (Y-path out of step 240), the wireless communication device responds to the page (if any) in step 270 by transmitting a response to the paging signal to the network node providing the primary cell.

If the decoding of step 260 is un-successful (N-path out from step 240), another one of the neighboring cells is selected in step 250 and it is attempted to decode the received paging signal based on one or more parameters of the newly selected neighboring cell in step 260, and so on.

The process may continue as long as there are neighboring cells to select from, or for a (predetermined or dynamically adjustable) maximum number of neighboring cells. According to some embodiments, the one or more neighboring cells comprise neighboring cells with respective received signal strength above a signal strength threshold (which may be seen as an approach to use a dynamically adjustable maximum number of neighboring cells). The maximum number of neighboring cells may be set to a low number (e.g. 1) if low power consumption is desirable. The maximum number of neighboring cells may be set to a higher number if a very low probability to miss a page (missed detection of a paging signal or paging message) is desirable.

In some embodiments, the neighboring cells are selected based on respective received signal strength (e.g. RSSI—received signal strength indicator) and/or a respective received signal power (e.g. RSRP—reference signal received power) as experienced by the wireless communication device. For example, the neighboring cell with highest received signal strength among the one or more neighboring cells may be selected first, the neighboring cell with next highest received signal strength among the one or more neighboring cells may be selected second, and so on. In some embodiments, an ordered list of neighboring cells is prepared based on respective received signal strength or received signal power to assist the selection step 250.

Typically, the paging signal stored in step 220 is discarded when any paging decoding is successful (Y-path out from step 240) and/or when the maximum number of neighboring cells has been tried for paging decoding.

Figure 3:
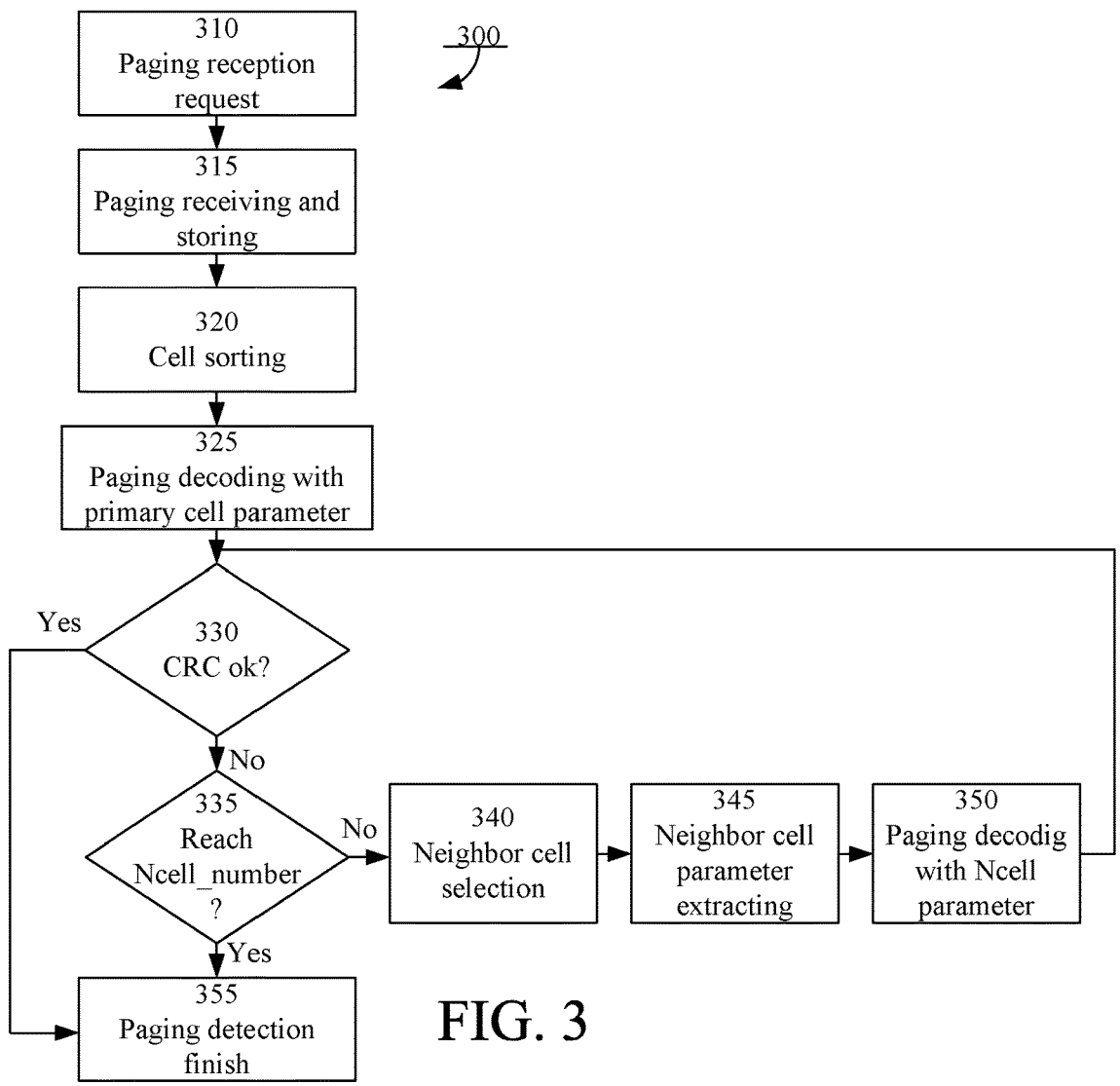
FIG. 3 is a flowchart illustrating example method steps according to some embodiments.

FIG. 3 illustrates an example method 300 according to some embodiments, which may be seen as a variation of the example method 200 of FIG. 2. It should be noted that suitable parts of the example methods 200 and 300 may be combined to provide other variations in addition to the embodiments presented herein.

A paging reception request is noted in step 310. The paging request may, for example, be an indication to a baseband part of a physical layer from higher layers of the implementation of the wireless communication device that a paging occasion is upcoming.

A paging signal is received and stored in step 315 (compare with steps 210 and 220 of FIG. 2) and the neighboring cells are sorted (e.g. by declining signal strength as elaborated in above) in step 320.

Paging decoding is attempted based on the parameters of the primary cell in step 325 (compare with step 230 of FIG. 3), and if the CRC passes (Yes-path out of step 330, compare with step 240 of FIG. 2) the paging detection is finished as indicated by step 355 and a paging response may be transmitted if applicable (compare with step 270 of FIG. 2).

If the CRC fails (No-path out of step 330, compare with step 240 of FIG. 2), it is determined whether a maximum number of neighboring cells (Ncell_number) has been tried in step 335. If so (Yes-path out of step 335), the paging detection is finished as indicated by step 355 and no paging decoding could be achieved.

If the maximum number of neighboring cells has not been tried (No-path out of step 335), a neighboring cell is selected in step 340 (compare with step 250 of FIG. 2) according to the list resulting from the sorting step 320.

The appropriate parameters of the selected cell are extracted in step 345 and paging decoding is attempted based on the parameters of the selected cell in step 350 (compare with step 260 of FIG. 3). An example applicable parameter is the cell identity, which is typically known from a neighboring cell list signaled to the wireless communication device during a location update procedure.

If the CRC passes (Yes-path out of step 330) the paging detection is finished as indicated by step 355 and a paging response may be transmitted if applicable (compare with step 270 of FIG. 2). Otherwise the process continues to iterate by proceeding to step 335.

Figure 4:
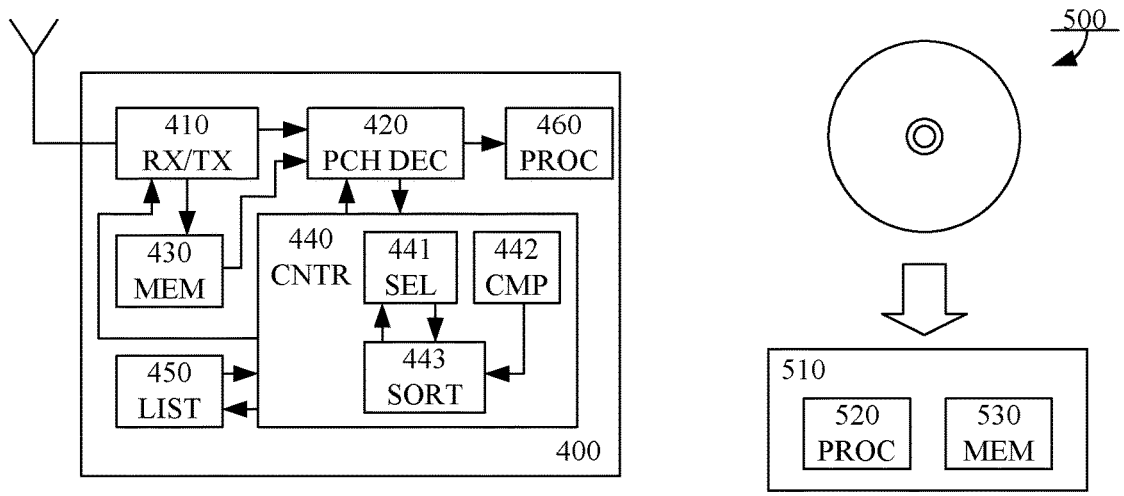
FIG. 4 is a block diagram illustrating an example arrangement according to some embodiments.

FIG. 4 schematically illustrates an example paging decoding arrangement 400 according to some embodiments. The example arrangement 400 may, for example, be adapted to perform any of the example methods described in connection with FIGS. 2 and 3. The example arrangement 400 may be comprised in a wireless communication device (compare with 100 of FIG. 1) adapted to operate in association with a primary cell provided by a network node of a cellular communication system, wherein the primary cell has one or more neighboring cells.

The arrangement 400 comprises a transceiver (RX/TX) 410, a signal storing unit (MEM) 430, a paging decoder (PCH DEC) 420 and a controller (CNTR) 440.

The transceiver 410 comprises a receiver adapted to receive a paging signal during a paging occasion (compare with step 210 of FIG. 2 and step 315 of FIG. 3).

The signal storing unit 430 is adapted to temporarily store the received paging signal (compare with step 220 of FIG. 2 and step 315 of FIG. 3).

The paging decoder 420 is adapted to decode the paging signal based on parameters provided to it by the controller 440 (compare with steps 230 and 260 of FIG. 2 and steps 325 and 350 of FIG. 3). Whether or not the decoding of the paging decoder 420 is successful is indicated to the controller 440.

The controller 440 is adapted to cause the paging decoder 420 to attempt to decode the received paging signal based on one or more parameters of the primary cell, and (if decoding of the received paging signal based on one or more parameters of the primary cell is un-successful) cause the paging decoder 420 to attempt to decode the temporarily stored received paging signal based on parameters of one of the neighboring cells.

The arrangement may comprise a cell list storing unit (LIST) 450, which may or may not be the same unit as the signal storing unit 430, adapted to hold a cell list received by the wireless communication device in connection with a location update procedure towards the cellular communication system, wherein the one or more neighboring cells comprise cells of the cell list.

The arrangement 400 may also comprise a selector (SEL) 441, associated with or comprised in the controller 440, adapted to select the neighboring cell, for example, based on respective received signal strengths of the neighboring cells. For this purpose, the arrangement 400 may also comprise a sorter (SORT) 443, associated with or comprised in the controller 440, adapted to sort the neighboring cells by received signal strength. The arrangement 400 may also comprise a comparator (CMP) 442, associated with or comprised in the controller 440, adapted to compare received signal strengths to a signal strength threshold. In some embodiments, only neighboring cells with respective received signal strength above the signal strength threshold are considered for paging decoding.

The transceiver 410 may comprise a transmitter adapted to transmit a response to the paging signal to the network node if any of the attempts to decode the received paging signal is successful. The arrangement may also comprise other processing units, schematically illustrated by a single processing block (PROC) 460.

A typical example associated with UMTS LTE will now be described with illustrative references to the example embodiment of FIG. 3.

In a typical UMTS LTE network deployment, the network is divided into different tracking areas (TA). A tracking area may comprise cells belonging to different network nodes (e.g. different eNodeB). In connection with a TA update process, a tracking area list will be sent to the wireless communication device (e.g. a user equipment, UE). The TA list typically comprises several tracking areas to avoid frequent TA updates due to ping-pang effects along TA borders.

When the network pages a UE, the paging messages are typically sent in all cells of the TA list. Therefore, the probability is high that a paging message to one UE is sent in the primary cell as well as the neighboring cells. For the rare situation when the neighboring cell does not comprise the same paging message as the primary cell, the message can simply be discarded after decoding of the message by higher layers according to some embodiments.

Thus, an enhanced paging reception method with assistance of intra-frequency neighboring cells is proposed according to some embodiments. In this example, the paging reception and decoding method comprises cell sorting (compare with step 320 of FIG. 3), PCH data receiving and storing (compare with step 315 of FIG. 3), paging decoding (compare with steps 325 and 350 of FIG. 3), and neighboring cell parameter extracting (compare with step 345 of FIG. 3).

Cell sorting may, for example, comprise getting the identity and received signal power or received signal strength information of the intra-frequency neighboring cells from the cell database (compare with list 450 of FIG. 4), select the intra-frequency neighboring cells with power in a certain range (e.g. above some threshold relative to the power or strength of the primary cell) and sort them by power or strength from high to low. After cell sorting, the parameter Ncell_number may be determined (e.g. equal to the number of selected cells or a lower number).

Paging data receiving and storing may, for example, comprise receiving the signals in the PO of PF and storing them in a local memory of the UE.

Paging messages are carried by PDSCH in the physical channel in this example. Paging decoding may, for example, comprise the UE detecting whether a control channel (e.g. the Physical Downlink Control Channel, PDCCH) carries a P-RNTI (Paging Radio Network Temporary Identifier) and, if so, extracting and decoding the paging symbols. If there is no P-RNTI in PDCCH, the paging demodulation procedure will not be active.

The parameters of a neighboring cell may, for example, be obtained from the cell database (compare with 450 of FIG. 4) if the neighboring cell has been registered. Otherwise, the parameters of the neighboring cell may be decoded. Alternatively, the neighboring cell identity may be used with parameters of the primary cell instead of acquiring all parameters of the neighboring cell. This alternative is often beneficial since cell parameters in a region (e.g. a tracking area) are often the same in many network deployments.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a user equipment (UE), a portable or handheld mobile radio communication equipment, a mobile radio terminal, a mobile telephone, a pager, a communicator, an electronic organizer, a smartphone, a computer, a notebook, or a mobile gaming device.

Figure 5:
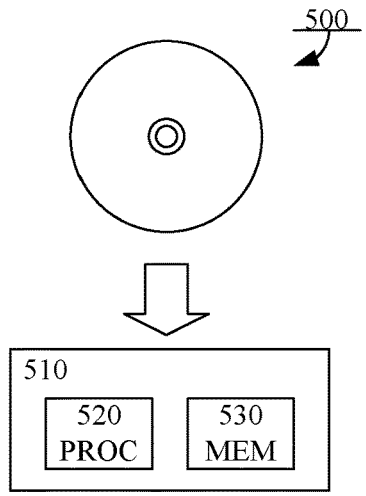
FIG. 5 is a schematic drawing illustrating a computer readable medium according to some embodiments.

As illustrated in FIG. 5, according to some embodiments, a computer program product comprises a computer readable medium such as, for example, a diskette, a USB-stick, a plug-in card, an embedded drive or a CD-ROM (such as the CD-ROM 500 illustrated in FIG. 5). The computer readable medium may have stored thereon a computer program comprising program instructions. The computer program may be loadable into a data-processing unit (PROC) 520, which may, for example, be comprised in a wireless communication device 510. When loaded into the data-processing unit 520, the computer program may be stored in a memory (MEM) 530 associated with or integral to the data-processing unit 520. According to some embodiments, the computer program may, when loaded into and run by the data-processing unit, cause the data-processing unit to execute method steps according to, for example, the methods shown in any of FIGS. 2 and 3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. For example, the selection step (250) of FIG. 2 may be performed between steps 220 and 230 in some embodiments. In another example, the sorting step (320) of FIG. 3 may be performed the first time the No-path out from step 330 is taken according to some embodiments. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A paging reception and decoding method in a wireless communication device adapted to operate in association with a primary cell provided by a network node of a cellular communication system, the method comprising:
receiving a paging signal during a paging occasion, wherein the paging occasion is used for the primary cell and for one or more neighboring cells of the primary cell, and wherein the paging signal comprises a signal component transmitted in the primary cell and one or more signal components transmitted in respective ones of the one or more neighboring cells;

temporarily storing the received paging signal;
attempting to decode the received paging signal based on one or more parameters of the primary cell; and
detecting that decoding of the received paging signal based on one or more parameters of the primary cell is un-successful, and in response thereto attempting to decode the temporarily stored received paging signal based on parameters of one of the one or more neighboring cells.

2. The method of claim 1 further comprising selecting the one of the neighboring cells based on one or more of respective received signal strengths of the neighboring cells and respective received signal powers of the neighboring cells.

3. The method of claim 2 wherein the one of the neighboring cells is selected after receiving the paging signal during the paging occasion.

4. The method of claim 3 wherein selecting the one of the neighboring cells comprises:
preparing an ordered list of the one or more neighboring cells based on one or more of respective received signal strengths of the neighboring cells and respective received signal powers of the neighboring cells before attempting to decode the received paging signal based on one or more parameters of the primary cell; and
detecting that decoding of the received paging signal based on one or more parameters of the primary cell is un-successful, and in response thereto selecting the one of the neighboring cells as the first cell of the ordered list.

5. The method of claim 1 wherein the one or more neighboring cells comprise cells of a cell list received by the wireless communication device in connection with a Tracking Area update process towards the cellular communication system.

6. The method of claim 1 wherein the one or more neighboring cells comprise cells with respective received signal strength above a signal strength threshold and/or cells with respective received signal power above a signal power threshold.

7. The method of claim 1 wherein the one or more parameters of the primary and neighboring cells comprise a respective cell identity.

8. The method of claim 1 wherein the decoding of the received paging signal based on one or more parameters of the primary cell is detected as un-successful in response to a failed cyclic redundancy check of the decoding.

9. The method of claim 1 further comprising, responding to an un-successful decoding of the temporarily received paging signal based on one or more parameters of the one of the neighboring cells by attempting to decode the temporarily stored received paging signal based on parameters of another one of the neighboring cells.

10. The method of claim 1 further comprising, responding to any of the attempts to decode the received paging signal being successful by transmitting a response to the paging signal to the network node.

11. A nontransitory computer readable storage medium, having thereon a computer program comprising program instructions, the computer program being loadable into a data-processing unit of a wireless communication device adapted to operate in association with a primary cell provided by a network node of a cellular communication system, wherein the computer program is adapted to cause the wireless communication device to perform a paging reception and decoding method when the computer program is run by the data-processing unit, wherein the method comprises:
receiving a paging signal during a paging occasion, wherein the paging occasion is used for the primary cell and for one or more neighboring cells of the primary cell, and wherein the paging signal comprises a signal component transmitted in the primary cell and one or more signal components transmitted in respective ones of the one or more neighboring cells;
temporarily storing the received paging signal;
attempting to decode the received paging signal based on one or more parameters of the primary cell; and
detecting that decoding of the received paging signal based on one or more parameters of the primary cell is un-successful, and in response thereto attempting to decode the temporarily stored received paging signal based on parameters of one of the one or more neighboring cells.

12. A paging reception and decoding arrangement for a wireless communication device adapted to operate in association with a primary cell provided by a network node of a cellular communication system, the arrangement comprising:
a receiver adapted to receive a paging signal during a paging occasion, wherein the paging occasion is used for the primary cell and for one or more neighboring cells of the primary cell, and wherein the paging signal comprises a signal component transmitted in the primary cell and one or more signal components transmitted in respective ones of the one or more neighboring cells;
a signal storing unit adapted to temporarily store the received paging signal;
a paging decoder adapted to decode the paging signal; and
a controller adapted to cause the paging decoder to:
attempt to decode the received paging signal based on one or more parameters of the primary cell; and
detect that decoding of the received paging signal based on one or more parameters of the primary cell is un-successful, and in response thereto attempt to decode the temporarily stored received paging signal based on parameters of one of the one or more neighboring cells.

13. The arrangement of claim 12 further comprising a selector adapted to select the one of the neighboring cells based on one or more of respective received signal strengths of the neighboring cells and respective received signal powers of the neighboring cells.

14. The arrangement of claim 12 further comprising a cell list storing unit adapted to hold a cell list received by the wireless communication device in connection with a Tracking Area update process towards the cellular communication system, wherein the one or more neighboring cells comprise cells of the cell list.

15. The arrangement of claim 12 further comprising a comparator adapted to compare received signal strengths to a signal strength threshold, wherein the one or more neighboring cells comprise cells with respective received signal strength above the signal strength threshold.

16. The arrangement of claim 12 further comprising a comparator adapted to compare received signal powers to a signal power threshold, wherein the one or more neighboring cells comprise cells with respective received signal power above the signal power threshold.

17. The arrangement of claim 12 wherein the controller is further adapted to cause the paging decoder to attempt to decode the temporarily stored received paging signal based on parameters of another one of the neighboring cells in response to decoding of the temporarily received paging signal based on one or more parameters of the one of the neighboring cells being un-successful.

18. The arrangement of claim 12 further comprising a transmitter adapted to transmit a response to the paging signal to the network node in response to any of the attempts to decode the received paging signal being successful.

19. The arrangement according to claim 12, configured to operate in a wireless communication device.

* * * * *